US012214514B2

(12) United States Patent
Squiers et al.

(10) Patent No.: US 12,214,514 B2
(45) **Date of Patent: *Feb. 4, 2025**

(54) UTILITY KNIFE

(71) Applicant: Milwaukee Electric Tool Corporation, Brookfield,, WI (US)

(72) Inventors: Grant T. Squiers, Cudahy, WI (US); Steven W. Hyma, Milwaukee, WI (US); Christopher S. Hoppe, Midvale, UT (US); Michael Stearns, Milwaukee, WI (US); Joseph M. DeBaker, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,977

(22) Filed: Jun. 29, 2023

(65) Prior Publication Data

US 2023/0339127 A1 Oct. 26, 2023

Related U.S. Application Data

(63) Continuation of application No. 18/058,047, filed on Nov. 22, 2022, now Pat. No. 11,724,408, which is a (Continued)

(51) Int. Cl.

*B26B 1/02* (2006.01)
*B26B 1/04* (2006.01)
*B26B 5/00* (2006.01)

(52) U.S. Cl.

CPC ................ *B26B 1/02* (2013.01); *B26B 1/046* (2013.01); *B26B 5/00* (2013.01); *B26B 5/003* (2013.01)

(58) Field of Classification Search

CPC .......... B26B 1/044; B26B 1/046; B26B 1/04; B26B 1/02

See application file for complete search history.

(56) References Cited

U.S. PATENT DOCUMENTS

| | | | |
|---|---|---|---|
| 23,975 | A | 5/1859 | Belcher |
| 226,910 | A | 4/1880 | Fkiebertshauser |

(Continued)

FOREIGN PATENT DOCUMENTS

| | | |
|---|---|---|
| CN | 2749642 | 1/2006 |
| CN | 201055994 | 5/2008 |

(Continued)

OTHER PUBLICATIONS

Notice of Allowance from the United States Patent and Trademark Office for U.S. Appl. No. 29/530,343 dated Jul. 15, 2016 (9 pages).

(Continued)

*Primary Examiner* — Jennifer S Matthews

(74) *Attorney, Agent, or Firm* — Reinhart Boerner Van Deuren s.c.

(57) ABSTRACT

A utility knife including a handle, a blade, a first blade holder, and a spare blade holder. The spare blade holder is pivotal with respect to the handle between an open position where the recess is exposed to allow a spare blade to be removed from the spare blade holder and a closed position where the recess is within a slot of the handle to inhibit removal of the spare blade from the spare blade holder. The spare blade holder further including a cam surface and the cam surface of the spare blade holder engages a cam surface of the handle when the spare blade holder is in the closed position to urge the spare blade holder in a direction from a first longitudinal side of the handle toward a second longitudinal side of the handle to allow the first blade holder to pivot between extended and folded positions.

11 Claims, 12 Drawing Sheets

Related U.S. Application Data continuation of application No. 16/189,696, filed on Nov. 13, 2018, now abandoned, which is a continuation of application No. 15/083,698, filed on Mar. 29, 2016, now Pat. No. 10,144,139.

(60) Provisional application No. 62/222,918, filed on Sep. 24, 2015, provisional application No. 62/180,238, filed on Jun. 16, 2015, provisional application No. 62/141,966, filed on Apr. 2, 2015.

(56) References Cited

U.S. PATENT DOCUMENTS

| | | | |
|---|---|---|---|
| 645,563 | A | 3/1900 | Heath |
| 1,599,604 | A | 9/1926 | Wetmore |
| 1,701,027 | A | 2/1929 | Brown |
| 1,769,093 | A | 7/1930 | Wuesthoff |
| 1,803,899 | A | 5/1931 | Fuller |
| 1,940,855 | A | 12/1933 | Friedman |
| 2,017,320 | A | 10/1935 | Mercer |
| 2,051,721 | A | 8/1936 | Kriangelos |
| 2,052,741 | A | 9/1936 | Bersted |
| 2,628,423 | A | 2/1953 | Cuntz |
| 2,679,100 | A | 5/1954 | Ehler |
| 2,709,299 | A | 5/1955 | Vizza |
| 2,814,108 | A | 11/1957 | Bassett |
| 2,839,831 | A | 6/1958 | Baer |
| 3,171,201 | A | 3/1965 | Carifi |
| 3,651,571 | A | 3/1972 | Neale |
| 3,845,554 | A | 11/1974 | Joanis et al. |
| 3,906,625 | A | 9/1975 | Gringer |
| 4,044,748 | A | 8/1977 | Villanueva |
| 4,068,375 | A | 1/1978 | Rathbun et al. |
| 4,240,201 | A | 12/1980 | Sawby et al. |
| 4,292,738 | A | 10/1981 | Osada |
| 4,347,665 | A | 9/1982 | Glesser |
| 4,439,922 | A | 4/1984 | Sassano |
| 4,535,539 | A | 8/1985 | Friedman et al. |
| 4,541,175 | A | 9/1985 | Boyd et al. |
| 4,551,917 | A | 11/1985 | Walker |
| 4,660,284 | A | 4/1987 | Decarolis |
| 4,670,984 | A | 6/1987 | Rickard |
| 4,706,385 | A | 11/1987 | Iten |
| 4,713,884 | A | 12/1987 | Dunnagan |
| 4,730,394 | A | 3/1988 | Sonner, Jr. |
| 4,750,267 | A | 6/1988 | Boyd |
| 4,773,159 | A | 9/1988 | Casazza, Jr. |
| D299,413 | S | 1/1989 | DeCarolis |
| 4,901,439 | A | 2/1990 | Boyd, Jr. |
| 4,918,820 | A | 4/1990 | Korb et al. |
| 4,922,614 | A | 5/1990 | Machida |
| 4,936,014 | A | 6/1990 | Shaanan et al. |
| 5,029,354 | A | 7/1991 | Boyd, Jr. et al. |
| 5,092,045 | A | 3/1992 | Boyd, Jr. et al. |
| 5,299,357 | A | 4/1994 | Wonderley et al. |
| 5,325,588 | A | 7/1994 | Rogers |
| 5,327,651 | A | 7/1994 | Favreau |
| 5,379,492 | A | 1/1995 | Glesser |
| 5,386,632 | A | 2/1995 | Schmidt |
| 5,425,175 | A | 6/1995 | Rogers |
| 5,495,674 | A | 3/1996 | Taylor, Jr. |
| 5,513,405 | A | 5/1996 | Bradbury, Jr. et al. |
| 5,546,662 | A | 8/1996 | Seber et al. |
| 5,561,906 | A | 10/1996 | Desmarais |
| 5,572,793 | A | 11/1996 | Collins et al. |
| 5,613,300 | A | 3/1997 | Schmidt |
| 5,704,129 | A | 1/1998 | Glesser |
| 5,722,168 | A | 3/1998 | Huang |
| 5,755,035 | A | 5/1998 | Weatherly |
| 5,794,346 | A | 8/1998 | Seber et al. |
| 5,815,927 | A | 10/1998 | Collins |
| 5,819,414 | A | 10/1998 | Marifone |
| 5,822,866 | A | 10/1998 | Pardue |
| 5,890,294 | A | 4/1999 | Keklak et al. |
| 5,964,036 | A | 10/1999 | Centofante |
| 6,101,724 | A | 8/2000 | Halligan |
| 6,192,589 | B1 | 2/2001 | Martone et al. |
| D439,492 | S | 3/2001 | Martone et al. |
| 6,249,975 | B1 | 6/2001 | Lin |
| 6,276,063 | B1 | 8/2001 | Chen |
| 6,305,085 | B1 | 10/2001 | Stallegger et al. |
| 6,314,646 | B1 | 11/2001 | Schmidt |
| 6,321,454 | B1 | 11/2001 | Wass |
| 6,415,514 | B1 | 7/2002 | Chun |
| 6,430,816 | B2 | 8/2002 | Neveux |
| 6,446,340 | B1 | 9/2002 | Ping |
| 6,446,341 | B1 | 9/2002 | Wang et al. |
| 6,513,246 | B2 | 2/2003 | Ping |
| 6,553,671 | B2 | 4/2003 | Blanchard |
| 6,553,672 | B2 | 4/2003 | Glesser et al. |
| 6,553,674 | B1 | 4/2003 | Budrow |
| 6,574,872 | B2 | 6/2003 | Roberts et al. |
| 6,578,221 | B2 | 6/2003 | Ping |
| 6,591,504 | B2 | 7/2003 | Onion |
| 6,678,958 | B1 | 1/2004 | Budrow |
| 6,688,003 | B2 | 2/2004 | Scarla |
| 6,688,407 | B2 | 2/2004 | Etter et al. |
| 6,694,558 | B2 | 2/2004 | Ping |
| 6,711,820 | B2 | 3/2004 | Chen |
| 6,732,436 | B2 | 5/2004 | Moizis |
| 6,735,872 | B1 | 5/2004 | Chang |
| 6,742,260 | B1 | 6/2004 | Hsu |
| 6,745,478 | B2 | 6/2004 | DeLillo |
| 6,763,592 | B2 | 7/2004 | Yu |
| D494,437 | S | 8/2004 | Scarla |
| D495,939 | S | 9/2004 | Ping |
| 6,813,833 | B2 | 11/2004 | Saunders et al. |
| 6,829,827 | B2 | 12/2004 | Tseng |
| 6,845,561 | B2 | 1/2005 | Timson |
| 6,845,694 | B2 | 1/2005 | Ping |
| D501,782 | S | 2/2005 | Ping |
| 6,862,764 | B2 | 3/2005 | Ping |
| 6,886,257 | B2 | 5/2005 | Chih |
| 6,915,577 | B2 | 7/2005 | Scala |
| D510,250 | S | 10/2005 | Ping |
| 6,951,055 | B1 | 10/2005 | Collins |
| 6,957,491 | B2 | 10/2005 | Van Deursen et al. |
| 6,968,622 | B2 | 11/2005 | Ping |
| 7,000,323 | B1 | 2/2006 | Hatcher |
| D516,403 | S | 3/2006 | Ping |
| D517,893 | S | 3/2006 | Ping |
| 7,007,392 | B2 | 3/2006 | Ping |
| D519,019 | S | 4/2006 | Ping |
| 7,040,022 | B2 | 5/2006 | Ping |
| D523,317 | S | 6/2006 | Ryan et al. |
| 7,055,407 | B2 | 6/2006 | Gringer et al. |
| 7,059,053 | B2 | 6/2006 | Sakai |
| D524,138 | S | 7/2006 | Chih |
| D526,878 | S | 8/2006 | Ping |
| D528,895 | S | 9/2006 | Ping |
| 7,107,685 | B1 | 9/2006 | Anderson |
| 7,107,686 | B2 | 9/2006 | Linn et al. |
| 7,121,005 | B2 | 10/2006 | Hughes |
| 7,131,204 | B2 | 11/2006 | Brown et al. |
| 7,134,207 | B2 | 11/2006 | Ping |
| 7,181,849 | B2 | 2/2007 | Menter |
| 7,185,435 | B1 | 3/2007 | Tseng |
| D539,628 | S | 4/2007 | Ping |
| D541,128 | S | 4/2007 | Farland |
| D545,165 | S | 6/2007 | Ping |
| 7,231,718 | B2 | 6/2007 | Outen |
| D552,955 | S | 10/2007 | Ping |
| D553,467 | S | 10/2007 | Ryan |
| 7,278,213 | B2 | 10/2007 | Pardue et al. |
| 7,284,329 | B1 | 10/2007 | King |
| 7,293,360 | B2 | 11/2007 | Steigerwalt et al. |
| 7,296,354 | B2 | 11/2007 | Van Deursen et al. |
| 7,302,760 | B2 | 12/2007 | Lake |
| 7,305,729 | B2 | 12/2007 | Dehner |
| 7,305,768 | B2 | 12/2007 | Hinderer |
| 7,313,866 | B2 | 1/2008 | Linn et al. |
| 7,325,312 | B1 | 2/2008 | Janich |
| 7,346,988 | B2 | 3/2008 | Gringer et al. |
| D566,222 | S | 4/2008 | Hawk et al. |

(56) References Cited

U.S. PATENT DOCUMENTS

| | | | |
|---|---|---|---|
| D568,136 | S | 5/2008 | Ping |
| 7,367,089 | B2 | 5/2008 | Cooke et al. |
| 7,380,341 | B2 | 6/2008 | Ping |
| 7,389,587 | B2 | 6/2008 | Di Bitonto et al. |
| 7,409,766 | B2 | 8/2008 | Steigerwalt |
| D581,240 | S | 10/2008 | Glesser et al. |
| 7,437,822 | B2 | 10/2008 | Flagg et al. |
| 7,451,545 | B2 | 11/2008 | Vörös |
| D583,899 | S | 12/2008 | MacNair et al. |
| D584,125 | S | 1/2009 | Ping |
| D584,377 | S | 1/2009 | MacNair et al. |
| 7,480,997 | B2 | 1/2009 | Ping |
| D588,433 | S | 3/2009 | van Deursen |
| 7,513,045 | B2 | 4/2009 | Kain |
| D592,034 | S | 5/2009 | Huang |
| D593,838 | S | 6/2009 | Williams |
| D596,914 | S | 7/2009 | Huang |
| 7,555,839 | B2 | 7/2009 | Koelewyn |
| 7,565,747 | B2 | 7/2009 | Cobb et al. |
| D599,433 | S | 9/2009 | Zore |
| 7,634,858 | B1 | 12/2009 | Frazer |
| D607,707 | S | 1/2010 | Huang |
| 7,647,701 | B1 | 1/2010 | Mollick |
| 7,676,932 | B2 | 3/2010 | Grice |
| 7,698,821 | B2 | 4/2010 | Ralph |
| 7,739,799 | B2 | 6/2010 | Van Deursen |
| 7,748,122 | B2 | 7/2010 | Duey |
| 7,752,759 | B2 | 7/2010 | Perreault |
| 7,774,940 | B2 | 8/2010 | Frank |
| 7,797,836 | B2 | 9/2010 | Ranieri et al. |
| 7,814,664 | B2 | 10/2010 | LeBlanc et al. |
| D629,274 | S | 12/2010 | Wu |
| 7,913,397 | B2 | 3/2011 | van Deursen |
| 7,946,201 | B2 | 5/2011 | Frazer |
| 7,979,990 | B2 | 7/2011 | Hawk et al. |
| 8,006,389 | B2 | 8/2011 | Jennings et al. |
| 8,028,419 | B2 | 10/2011 | VanHoy |
| 8,069,569 | B2 | 12/2011 | Brown et al. |
| 8,099,870 | B1 | 1/2012 | Ralph |
| 8,099,871 | B2 | 1/2012 | Bilenski |
| 8,112,894 | B2 | 2/2012 | Caswell |
| 8,171,645 | B2 | 3/2012 | Duey |
| 8,161,653 | B2 | 4/2012 | Nenadic |
| 8,186,065 | B2 | 5/2012 | Onion |
| 8,201,336 | B2 | 6/2012 | De |
| 8,286,356 | B1 | 10/2012 | Mollick et al. |
| 8,375,589 | B2 | 2/2013 | Bremer et al. |
| 8,413,337 | B2 | 4/2013 | Price |
| 8,549,754 | B2 | 10/2013 | Bung et al. |
| 8,567,070 | B2 | 10/2013 | Rowlay et al. |
| D696,567 | S | 12/2013 | Leh et al. |
| 8,621,753 | B2 | 1/2014 | Price |
| 8,646,184 | B2 | 2/2014 | Westerfield |
| D703,510 | S | 4/2014 | Hyma |
| D703,590 | S | 4/2014 | Futschik et al. |
| 8,683,703 | B2 | 4/2014 | Rowlay et al. |
| 8,793,881 | B2 | 8/2014 | Rowlay et al. |
| 8,959,779 | B2 | 2/2015 | Wen |
| D741,680 | S | 10/2015 | Hunter et al. |
| 2002/0029480 | A1 | 3/2002 | Lin |
| 2002/0066187 | A1 | 6/2002 | Jennings |
| 2002/0157260 | A1 | 10/2002 | Cheng |
| 2003/0037444 | A1 | 2/2003 | Chunn |
| 2003/0213133 | A1 | 11/2003 | Hanna |
| 2004/0103541 | A1 | 6/2004 | Scarla |
| 2004/0154170 | A1 | 8/2004 | Kain et al. |
| 2005/0022390 | A1 | 2/2005 | Whitemiller |
| 2005/0044717 | A1 | 3/2005 | Tomio |
| 2005/0144788 | A1 | 7/2005 | Lake |
| 2005/0150115 | A1 | 7/2005 | Hanna |
| 2005/0155226 | A1 | 7/2005 | Van Deursen et al. |
| 2005/0172497 | A1 | 8/2005 | Linn et al. |
| 2005/0193566 | A1 | 9/2005 | Brown et al. |
| 2005/0223562 | A1 | 10/2005 | Pardue et al. |
| 2005/0223567 | A1 | 10/2005 | Cobb et al. |
| 2005/0283983 | A1 | 12/2005 | Huang |
| 2006/0005397 | A1 | 1/2006 | Steigerwalt |
| 2006/0008041 | A1 | 1/2006 | Kim et al. |
| 2006/0026844 | A1 | 2/2006 | Ping |
| 2006/0053631 | A1 | 3/2006 | Fossella |
| 2006/0080841 | A1 | 4/2006 | Hatcher et al. |
| 2006/0137190 | A1 | 6/2006 | Van Deursen et al. |
| 2007/0056169 | A1 | 3/2007 | Cheng |
| 2007/0169353 | A1 | 7/2007 | Wu |
| 2007/0169354 | A1 | 7/2007 | Ralph |
| 2007/0256304 | A1 | 11/2007 | Pardue et al. |
| 2007/0294896 | A1 | 12/2007 | Brown et al. |
| 2008/0110029 | A1 | 5/2008 | Ryan et al. |
| 2008/0172884 | A1 | 7/2008 | Cheng |
| 2008/0201953 | A1 | 8/2008 | Bremer et al. |
| 2008/0216326 | A1 | 9/2008 | Klecker et al. |
| 2008/0235954 | A1 | 10/2008 | Radle |
| 2008/0250650 | A1 | 10/2008 | Seber et al. |
| 2008/0276462 | A1 | 11/2008 | Kao |
| 2008/0301907 | A1 | 12/2008 | Chunlung |
| 2008/0301949 | A1 | 12/2008 | Enga et al. |
| 2009/0013537 | A1 | 1/2009 | Kao |
| 2009/0217533 | A1 | 9/2009 | Kao |
| 2009/0255127 | A1 | 10/2009 | Seymour et al. |
| 2010/0175267 | A1 | 7/2010 | Seber et al. |
| 2010/0180449 | A1 | 7/2010 | Van Deursen |
| 2010/0281696 | A1 | 11/2010 | Hao |
| 2011/0067246 | A1 | 3/2011 | Perez |
| 2012/0023753 | A1 | 2/2012 | Wen |
| 2012/0066910 | A1 | 3/2012 | Shantha |
| 2012/0144677 | A1 | 6/2012 | Chang |
| 2012/0159789 | A9 | 6/2012 | Frazer |
| 2012/0174412 | A1 | 7/2012 | Ho |
| 2012/0234142 | A1 | 9/2012 | Onion |
| 2012/0304472 | A1 | 12/2012 | Medhurst |
| 2013/0042485 | A1 | 2/2013 | Wen |
| 2013/0125403 | A1 | 5/2013 | Westerfield |
| 2013/0255002 | A1 | 10/2013 | Keers et al. |
| 2014/0373364 | A1 | 12/2014 | Li |
| 2015/0082641 | A1 | 3/2015 | Wang |

FOREIGN PATENT DOCUMENTS

| | | | | |
|---|---|---|---|---|
| CN | 201669709 | | 12/2010 | |
| CN | 102806567 | | 12/2012 | |
| GB | 2462539 A | * | 2/2010 | ............. B26B 5/001 |
| TW | 201325848 | | 7/2013 | |
| WO | WO2013/033564 | | 3/2013 | |
| WO | WO-2014000347 A1 | * | 1/2014 | ............... B26B 1/02 |

OTHER PUBLICATIONS

Notice of Allowance from the United States Patent and Trademark Office for U.S. Appl. No. 29/530,349 dated Jun. 24, 2016 (9 pages).

Milwaukee Fastback(TM) Flip Utility Knife. Downloaded at http://grainer.com/Grainger/MILWAUKEE-Flip-Utility-Knife- 6CMY2 on Jun. 8, 2012 (2 pages).

* cited by examiner

UTILITY KNIFE

CROSS-REFERENCE TO RELATED APPLICATIONS

This application is a continuation of U.S. application Ser. No. 18/058,047, filed Nov. 22, 2022, now U.S. Pat. No. 11,724,408, which is a continuation of U.S. application Ser. No. 16/189,696, filed Nov. 13, 2018, which is a continuation of U.S. application Ser. No. 15/083,698, now U.S. Pat. No. 10,144,139, filed Mar. 29, 2016, which claims priority to U.S. Provisional Application No. 62/222,918, filed Sep. 24, 2015, U.S. Provisional Application No. 62/180,238, filed Jun. 16, 2015, and U.S. Provisional Application No. 62/141,966, filed Apr. 2, 2015, the entire contents of each of which are hereby incorporated by reference herein.

BACKGROUND

The present invention relates to utility knives. Utility knifes typically include a handle and a blade. In some utility knives, the blade slides relative to the handle from a retracted position, where the blade is stored inside the handle, to an extended position where the blade extends from the handle. In the extended position, the blade is used to cut a work-piece. In other types of the utility knives, the blade pivots relative to the handle. In both types of utility knifes the blade is typically replaceable.

SUMMARY

In one embodiment, the invention provides a utility knife including a handle that includes a first longitudinal side, a second longitudinal side opposite the first longitudinal side, a top side, a bottom side, and a slot that extends through the bottom side. The slot is between the first and second longitudinal sides and the handle further including a cam surface. The utility knife further includes a blade and a first blade holder. The blade is removably coupled to the first blade holder, and the first blade holder is pivotal with respect to the handle between an extended position where the blade is exposed and configured to cut a work-piece and a folded position where the blade is within the slot of the handle. The utility knife further includes a spare blade holder including a recess configured to receive a spare blade. The spare blade holder is pivotal with respect to the handle between an open position where the recess is exposed to allow the spare blade to be removed from the spare blade holder and a closed position where the recess is within the slot of the handle to inhibit removal of the spare blade from the spare blade holder. The spare blade holder further including a cam surface and the cam surface of the spare blade holder engages the cam surface of the handle when the spare blade holder is in the closed position to urge the spare blade holder in a direction from the first longitudinal side of the handle toward the second longitudinal side of the handle to allow the first blade holder to pivot between the extended and folded positions.

In another embodiment the invention provides a utility knife including a handle that includes a first longitudinal side, a second longitudinal side opposite the first longitudinal side, a top side, a bottom side, and a slot that extends through the bottom side, the slot between the first and second longitudinal sides. The utility knife further includes a blade and a blade holder. The blade is removably coupled to the blade holder and the blade holder is pivotal with respect to the handle between an extended position where the blade is exposed and configured to cut a work-piece and a folded position where the blade is within the slot of the handle. The utility knife further includes a locking mechanism including a biasing member and an actuator movable between a locked position and an unlocked position. The blade holder is pivotable with respect to the handle between the extended and folded positions when the actuator is in the unlocked position and the blade holder is held from pivotally movement relative to the handle when the actuator is in the locked position. The biasing member that biases the actuator toward the locked position. The handle further includes an accommodating portion that extends outwardly from the second longitudinal side and at least a portion of the biasing member extends into the accommodating portion when the actuator is in the unlocked position.

In another embodiment the invention provides a utility knife including a handle that includes a first longitudinal side, a second longitudinal side opposite the first longitudinal side, a top side, a bottom side, and a slot that extends through the bottom side, the slot between the first and second longitudinal sides. The utility knife further includes a blade and a blade holder. The blade is removably coupled to the blade holder and the blade holder is pivotal with respect to the handle between an extended position where the blade is exposed and configured to cut a work-piece and a folded position where the blade is within the slot of the handle. The blade holder includes a first notch and a second notch. The utility knife further includes a coil spring and a locking mechanism including a push button movable between a locked position and an unlocked position. The blade holder is pivotable with respect to the handle between the extended and folded positions when the push button is in the unlocked position and the blade holder is held from pivotally movement relative to the handle when the push button is in the locked position. The push button includes a first portion of a first diameter and a second portion of a second diameter that is larger than the first diameter and a frusto-conical portion between the first and second portions. The second portion of the push button is received in the first notch of the blade holder to hold the blade holder in the extended position and the second portion of the push button is received in the second notch of the blade holder to hold the blade holder in the folded position. The coil spring biases the actuator toward the locked position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
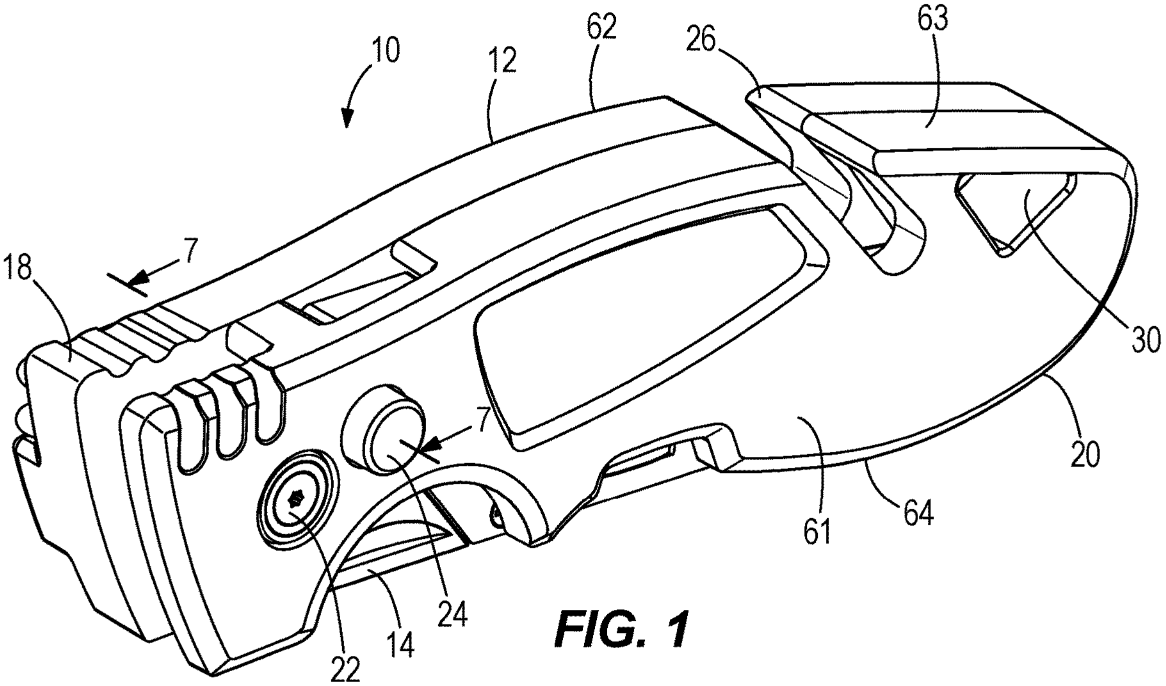
FIG. 1 is a perspective view of a utility knife according to an embodiment of the invention.
Figure 2:
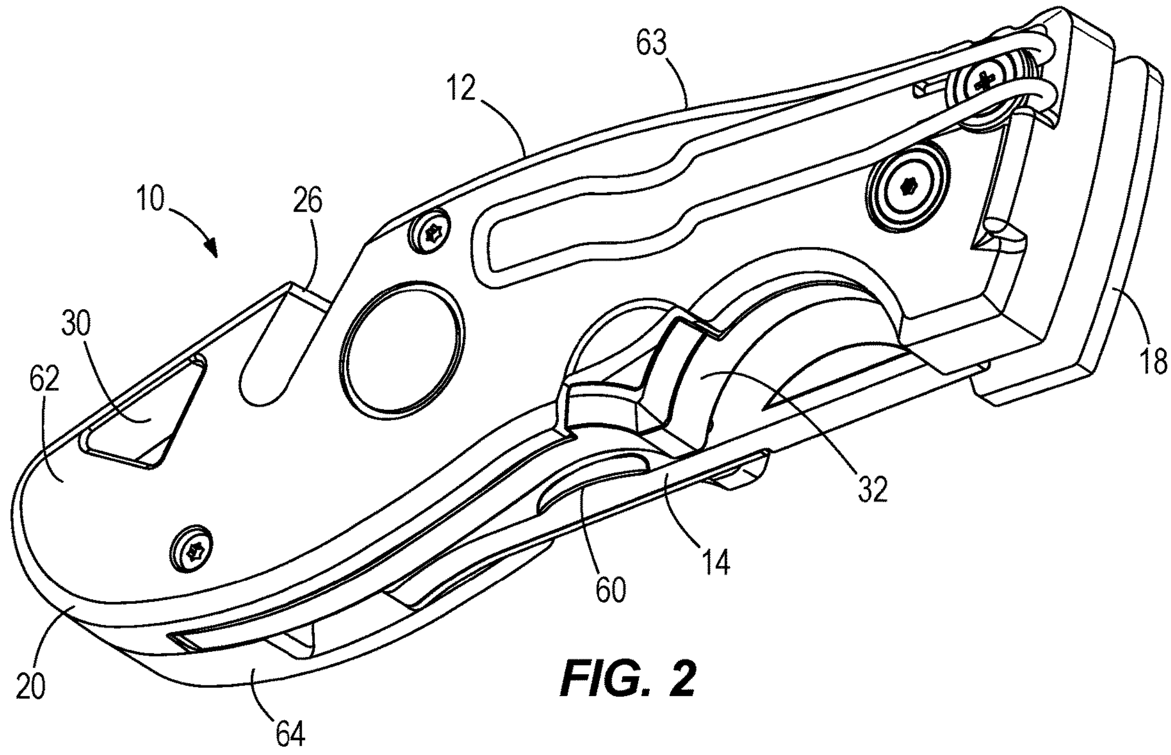
FIG. 2 is an alternative perspective view of the utility knife of FIG. 1.
Figure 3:
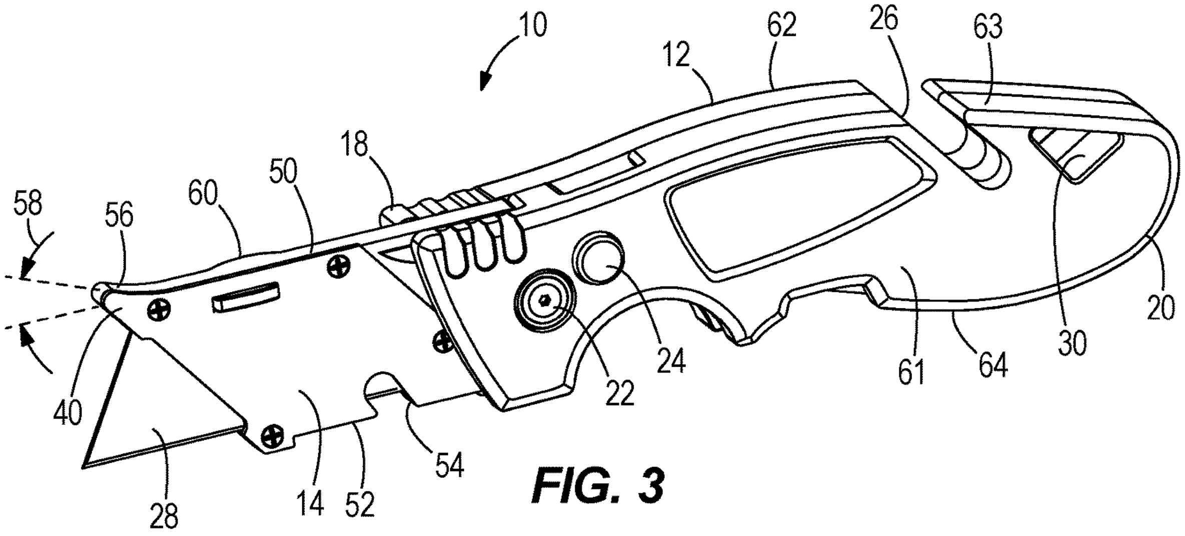
FIG. 3 is a perspective view of the utility knife of FIG. 1 with a blade holder in the extended position.

FIGS. 1-4 illustrate a knife 10, which is a utility knife in the illustrated embodiment. The knife 10 includes a handle 12 and a blade holder 14 that is pivotally coupled to the handle 12 and movable between a folded or retracted position (FIG. 2) and an extended position (FIG. 3). The handle 12 includes a front end portion 18 and a back end portion 20. The blade holder 14 is pivotally attached to the front end portion 18 of the handle 12 via a fastener 22. The handle 12 further includes a first longitudinal side 61, a second longitudinal side 62 opposite the first longitudinal side 61, a top side 63, and a bottom side 64. A slot 65 extends through the bottom side 64 between the first and second sides 61, 62. The illustrated sides 61, 62 are generally flat.

The back end portion 20 of the handle 12 includes a cutout or hook portion 26. The cutout 26 exposes a portion of a blade 28 held by the blade holder 14 when the blade holder 14 is in the folded position so that the blade 28 can be used to cut wire, rope, line, etc. The back end portion 20 of the handle 12 further includes an aperture 30 that extends through the handle 12. The aperture 30 provides a location for the user to attach the knife 10 to a lanyard, belt, clip, or the like.

Figure 5:
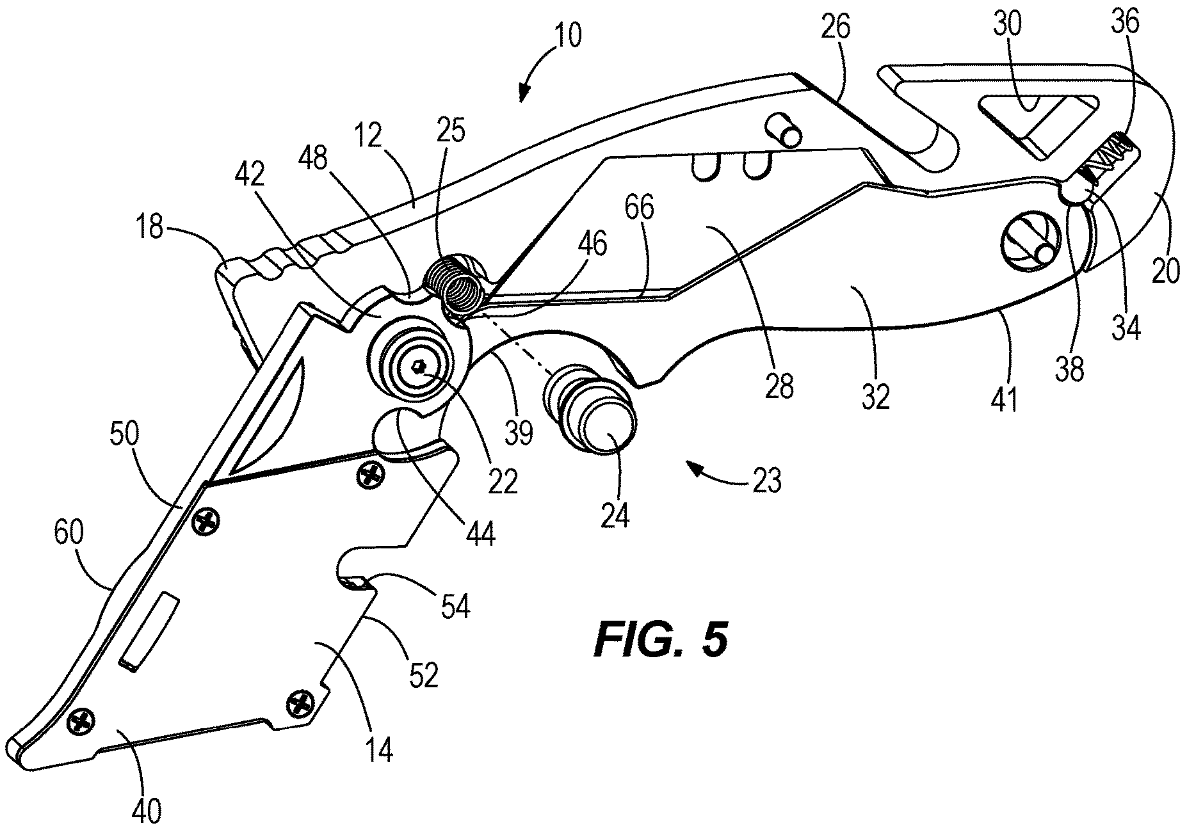
FIG. 5 is a perspective view of the utility knife of FIG. 1 with a portion of the handle removed and the blade holder in a partially extended position.
Figure 7:
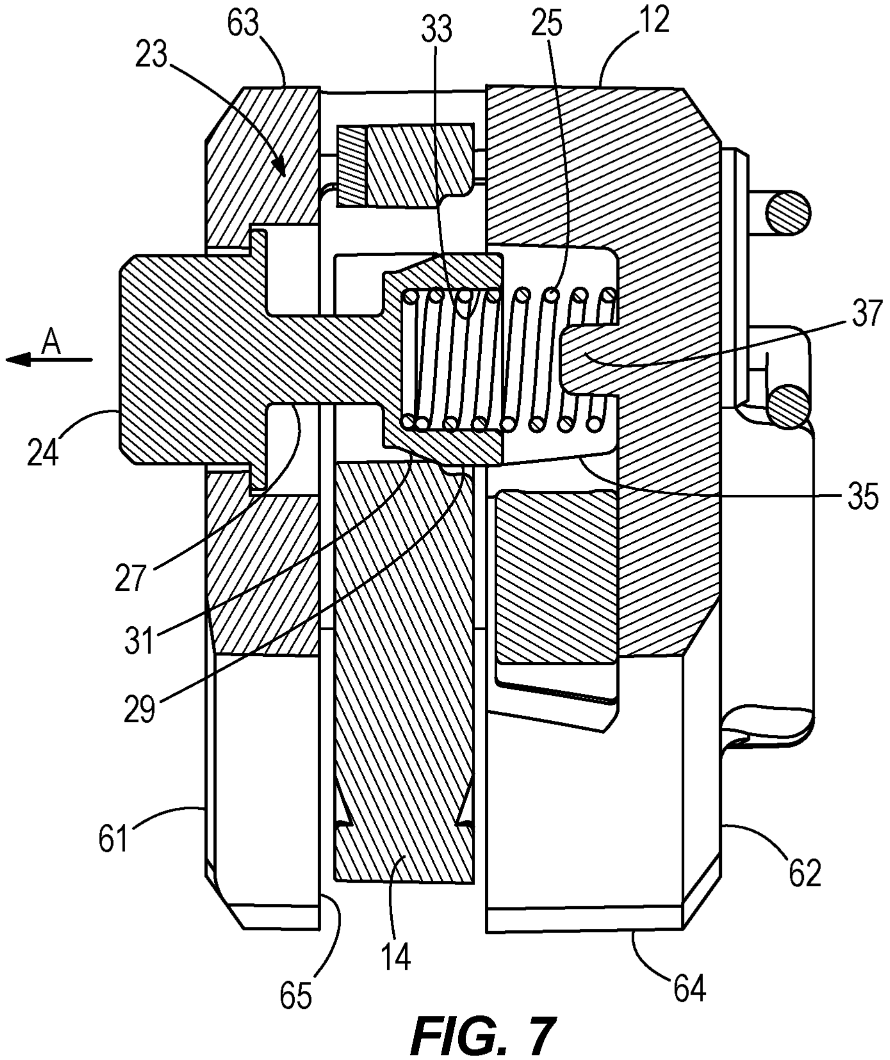
FIG. 7 is a cross-sectional view of the utility knife of FIG. 1, taken along line 7-7 in FIG. 1.

With reference to FIGS. 5 and 7, the knife 10 further includes a locking mechanism 23 located at the front end portion 18 of the handle 12 and operable to lock and unlock the blade holder 14 to allow the user to pivot the blade holder 14 relative to the handle 12. The locking mechanism 23 includes a push button 24 and a spring 25, which is a coil spring in the illustrated embodiment. The spring 25 biases the push button 24 in the direction of arrow A in FIG. 7. The push button 24 has a first portion 27 of a first diameter and a second portion 29 of a second diameter that is larger than the first diameter. The illustrated second portion 29 has a generally frusto-conical external surface 31 and a cylindrical recess 33. One end of the spring 25 is received within the recess 33, and an opposite end of the spring 25 is received within a recess 35 in the handle 12. In the illustrated embodiment, a post 37 is provided within the recess 35 to stabilize the spring 25.

Figure 4:
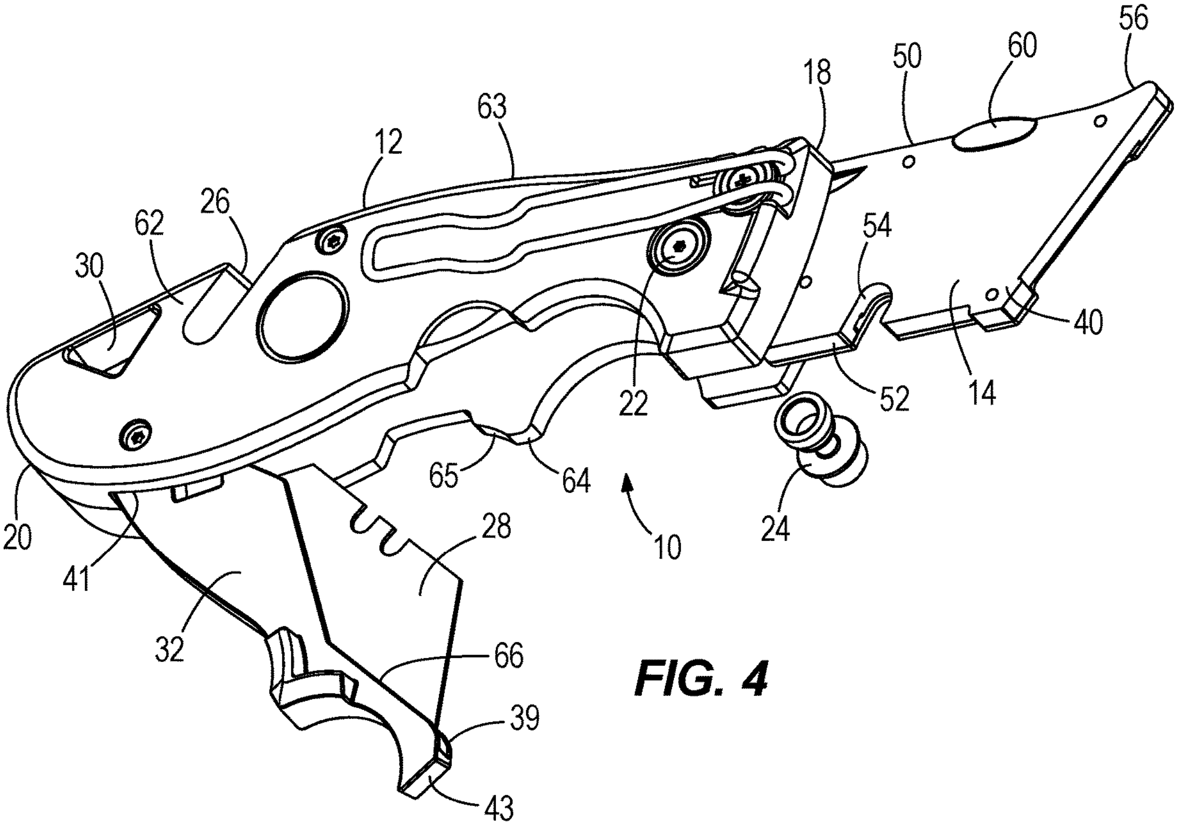
FIG. 4 is an alternative perspective view of the utility knife of FIG. 1 with the blade holder in the extended position and a blade storage compartment in an open position.

Referring to FIGS. 2, 4, and 5, the knife 10 further includes a spare blade holder 32 having a front end 39 and a back end 41, which is pivotally attached to the back end portion 20 of the handle 12. The spare blade holder 32 retains spare utility blades 28 in a recess 66 of the spare blade holder 32. In one embodiment the spare blade holder 32 retains four or more spare utility blades 28. The spare blade holder 32 is pivotable between a closed position (FIG. 2) and an open position (FIG. 4). A ball 34 (FIG. 5) is biased by a spring 36 into an aperture 38 of the spare blade holder 32 to retain the spare blade holder 32 in the closed position. In one embodiment, the spare blade holder 32 includes a magnet to retain the spare blades 28 in the holder 32.

Figure 8:
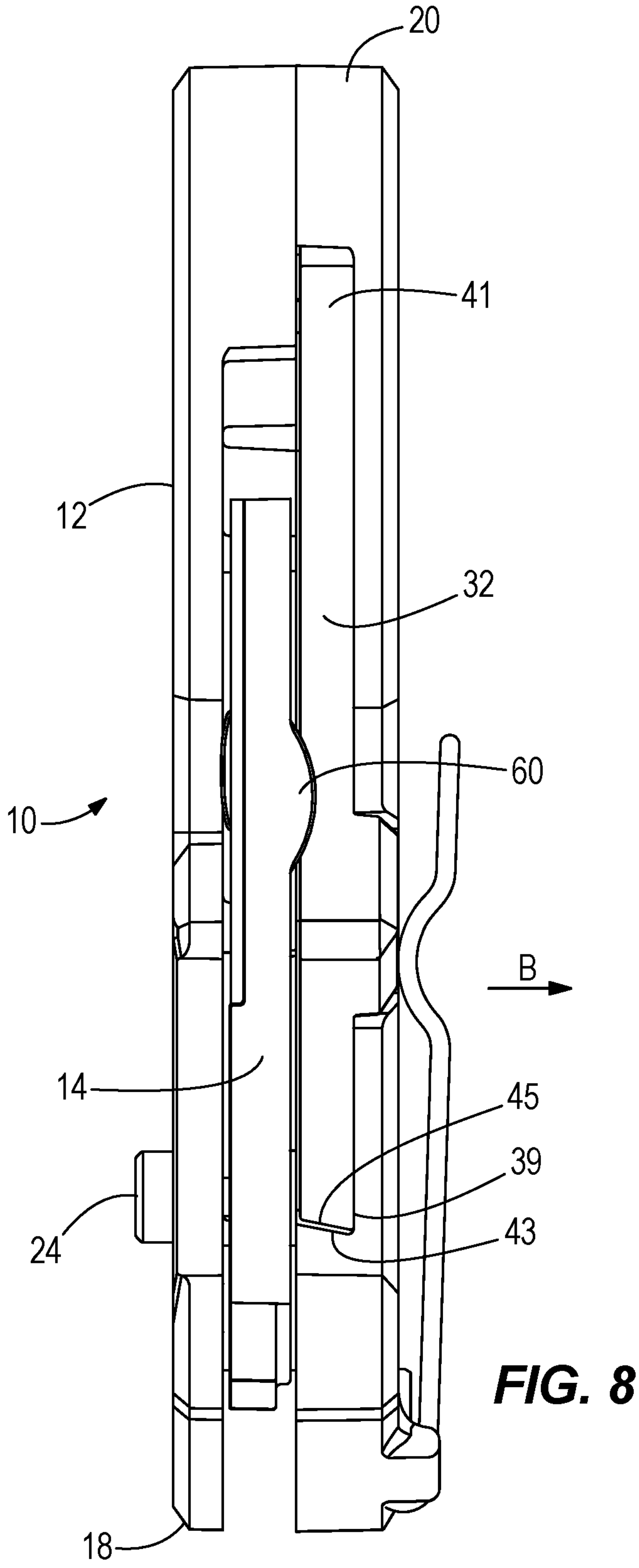
FIG. 8 is a bottom view of the utility knife of FIG. 1.
Figure 9:
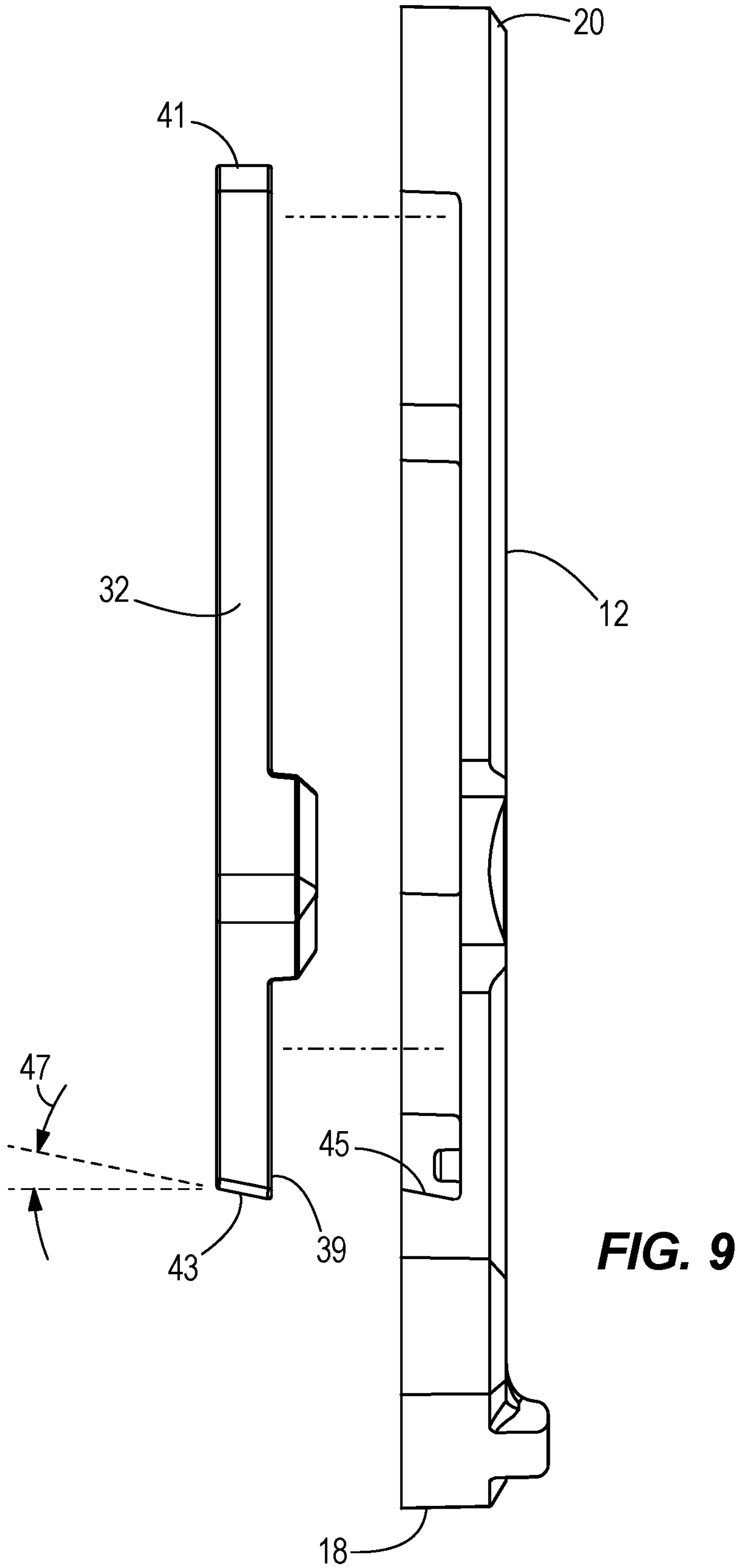
FIG. 9 is an exploded view of a portion of the utility knife of FIG. 1.
Figure 10:
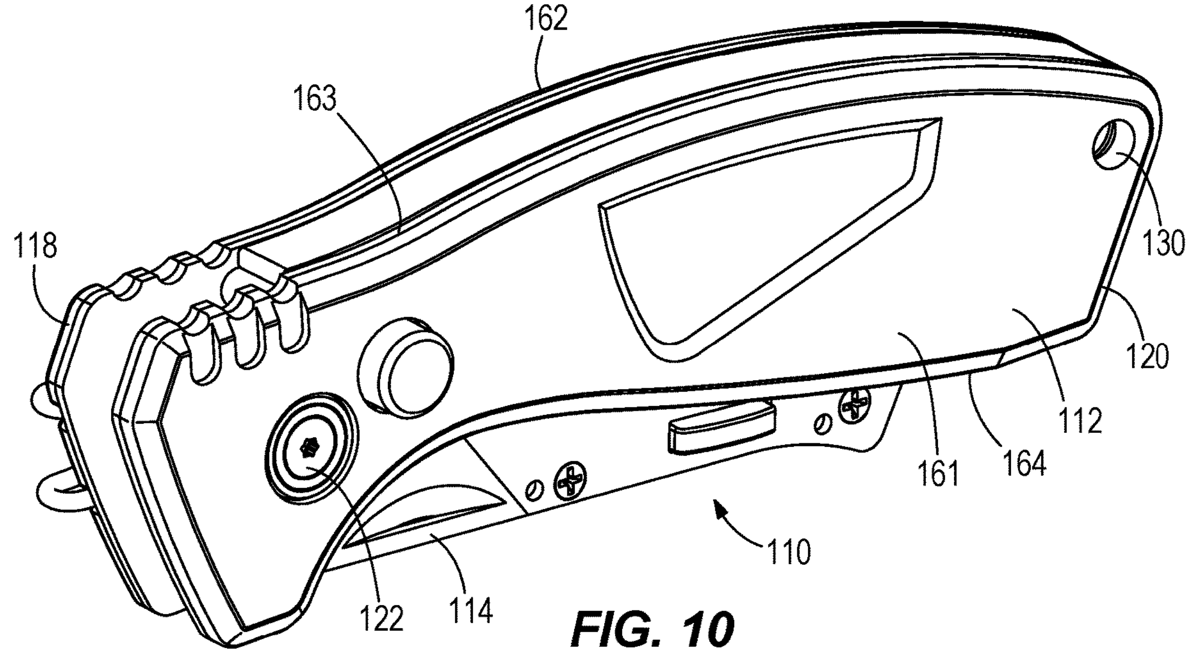
FIG. 10 is a perspective view of a utility knife according to another embodiment of the invention.
Figure 11:
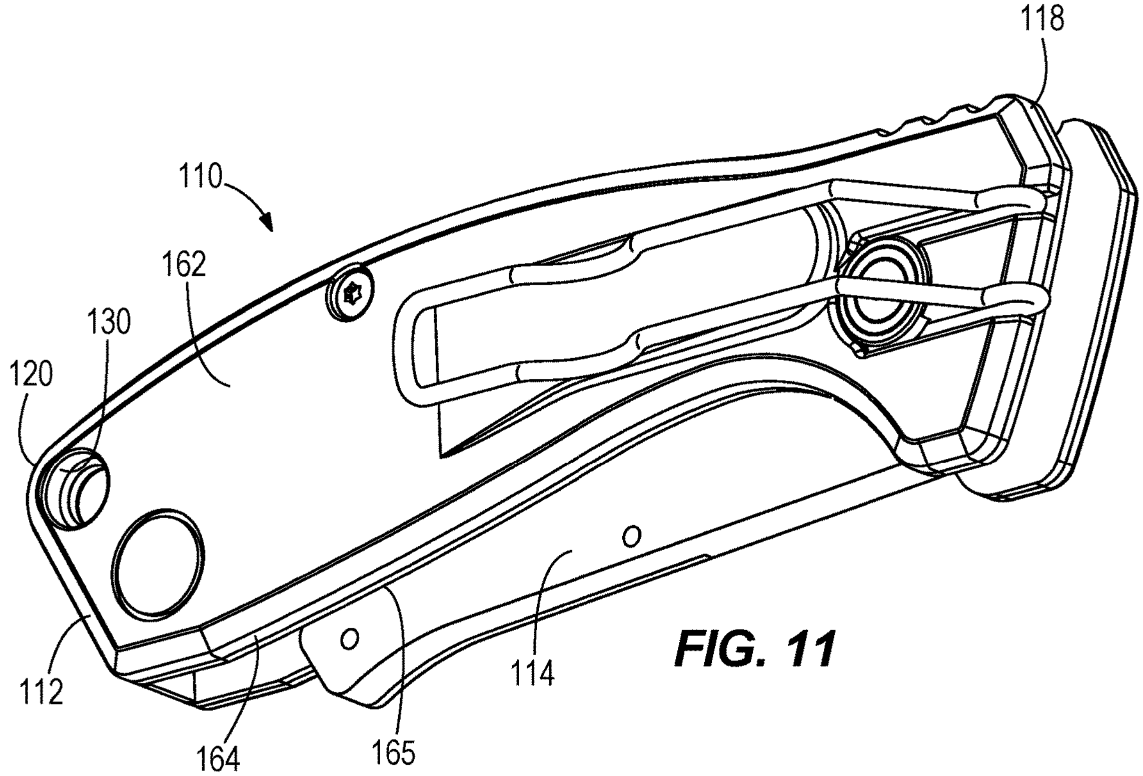
FIG. 11 is an alternative perspective view of the utility knife of FIG. 10.
Figure 12:
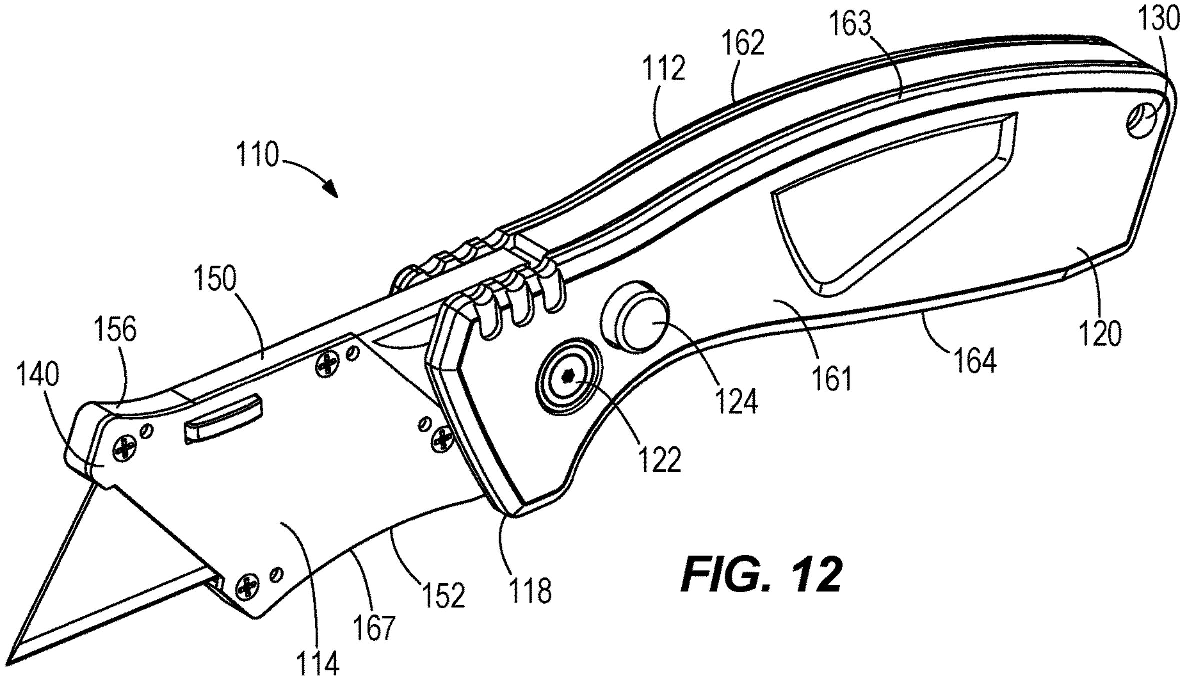
FIG. 12 is a perspective view of the utility knife of FIG. 10 with a blade holder in the extended position.
Figure 13:
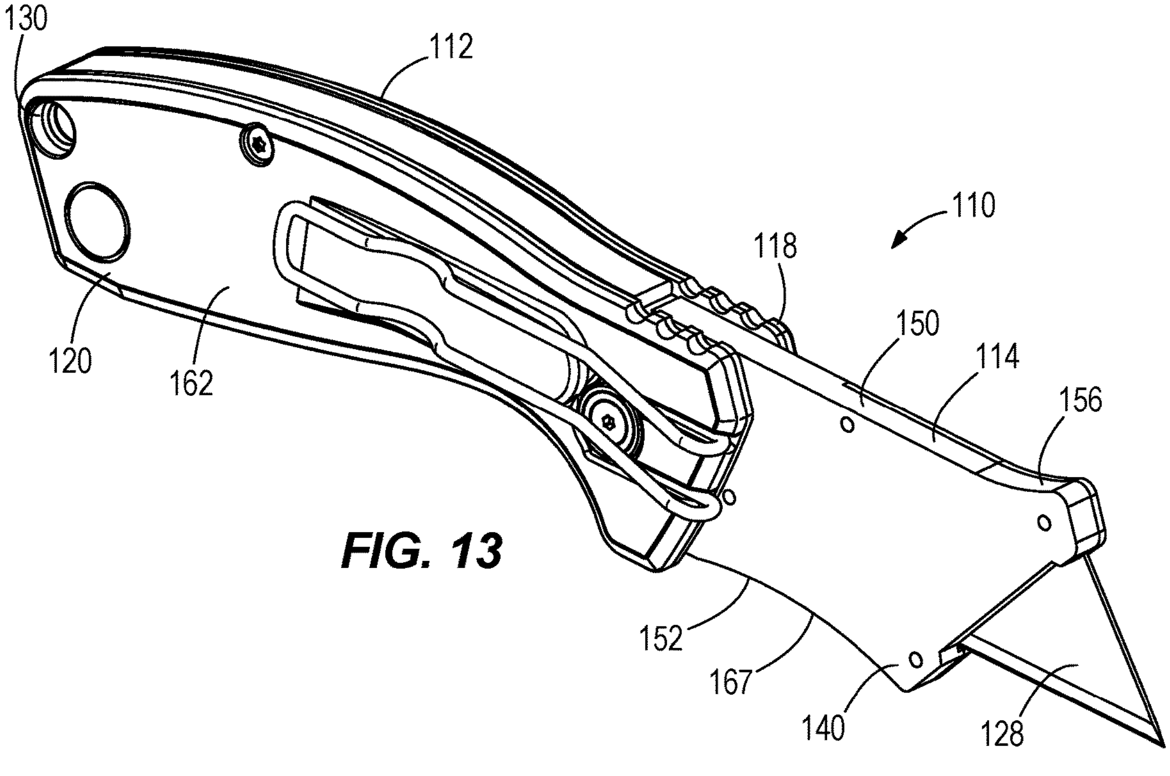
FIG. 13 is an alternative perspective view of the utility knife of FIG. 10 with the blade holder in the extended position.
Figure 14:
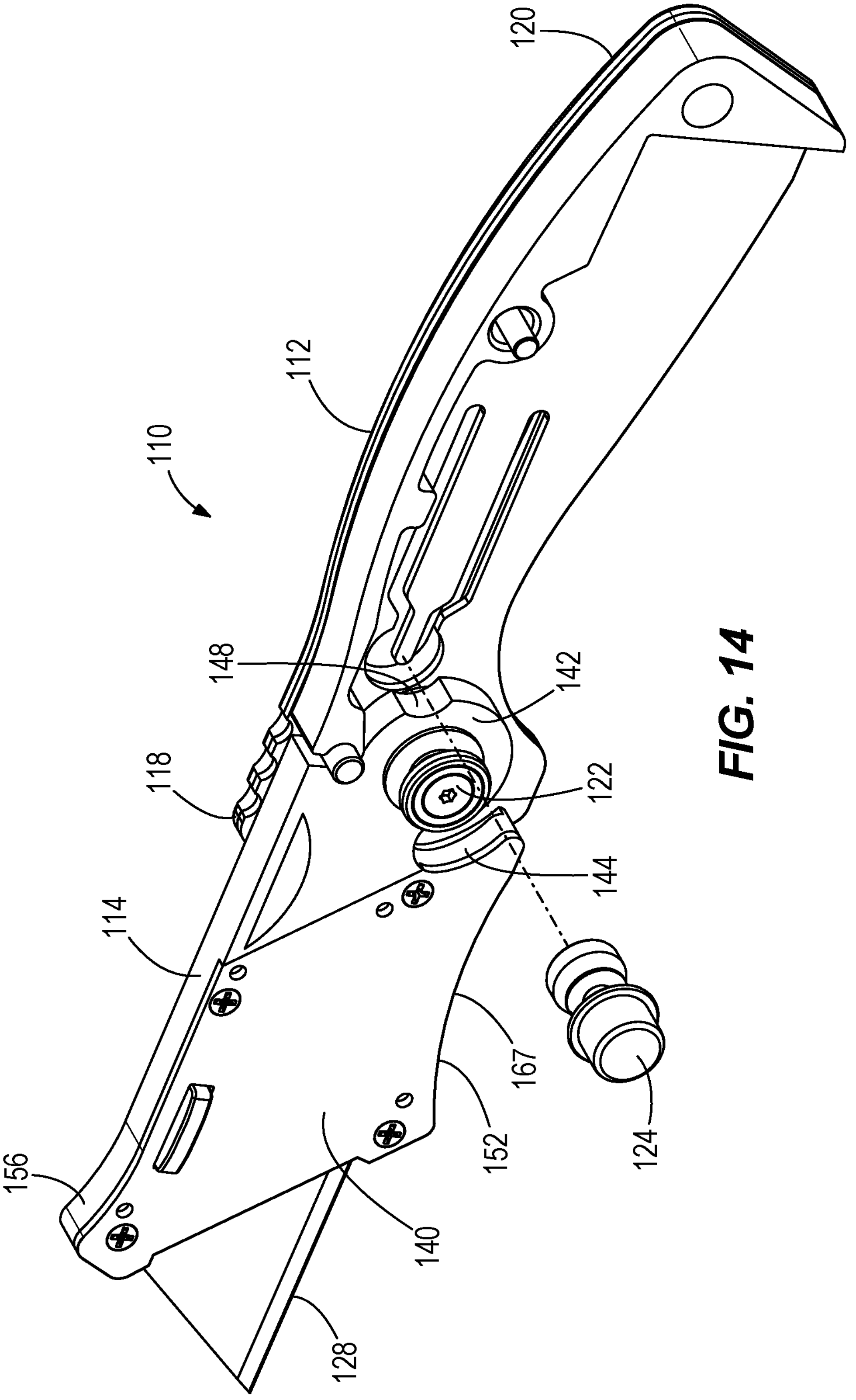
FIG. 14 is a perspective view of the utility knife of FIG. 10 with a portion of the handle removed and the blade holder in the extended position.

With reference to FIGS. 8 and 9, the front end 39 of the spare blade holder 32 includes an angled cam surface 43 that bears against a corresponding angled cam surface 45 provided on the handle 12 when the spare blade holder 32 is in the closed position. The engagement of the cam surfaces 43, 45 forces the spare blade holder 32 against the handle 12 in the direction of arrow B in FIG. 8. This arrangement inhibits the spare blade holder 32 from interfering with movement of the blade holder 14. In some embodiments, the cam surface 43 defines an angle 47 between about 5 degrees and about 30 degrees (FIG. 9). In the illustrated embodiment, the angle 47 is about 10 degrees.

Figure 6:
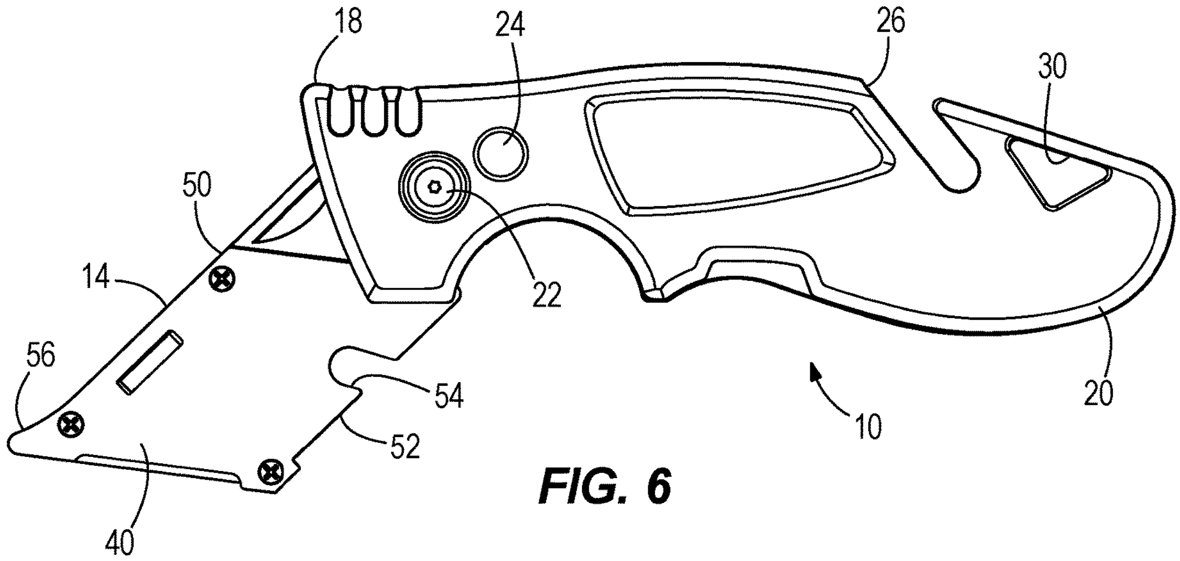
FIG. 6 is a side view of the utility knife of FIG. 1 with the blade holder in the partially extended position.

Referring to FIGS. 3 and 5, the blade holder 14 includes a front end portion 40 and a back end portion 42. The blade holder 14 is pivotally attached to the handle 12 at the back end portion 42 of the blade holder 14 and the blade 28 extends from the front end portion 40 of the blade holder 14. The back end portion 42 of the blade holder 14 includes notches 44, 46, and 48. When the second portion 29 of the push button 24 is received in the first notch 44, the blade holder 14 is held in the folded or closed position. When the second portion 29 is received in the third notch 48, the blade holder 14 is held in the fully extended position (FIG. 3). When the second portion 29 of the push button 24 is received in the second notch 46, the blade holder 14 is held in a partially extended or intermediate position illustrated in FIGS. 5 and 6, which is between the folded position and the fully extended position. The intermediate position may be more convenient and ergonomic for certain applications. For example, using the knife 10 with the blade holder 14 in the intermediate position is particularly advantageous for cutting carpet or for cutting materials overhead. The blade holder 14 preferably extends at an angle between about 30 degrees and about 60 degrees relative to the handle 12 when in the intermediate position. In the illustrated embodiment, the blade holder 14 extends at an angle of about 45 degrees relative to the handle 12 when in the intermediate position.

The blade holder 14 further includes a top edge 50 and a bottom edge 52. The bottom edge 52 include a recess 54 that exposes a portion of the blade 28 so that the blade 28 can be used to strip insulation from wire or to cut wire, rope, line, etc. An upwardly angled surface 56 is located along the top edge 50 at the front end 40 of the blade holder 14. The surface 56 is upwardly angled at an angle 58 (FIG. 3). In some embodiments, the angle 58 is between about 5 degrees and about 60 degrees. The surface 56 provides the user with a place to push with their finger (e.g., thumb when using the knife). Also, the surface 56 inhibits the user's finger (e.g., thumb) from sliding off of the front of top edge 50 when the user places their finger on the top edge 50 when using the knife to cut a work piece. The top edge 50 of the blade holder 14 further includes an enlarged surface 60 that extends out laterally from the top edge 50. The surface 60 is integrally formed with the blade holder 14 and provides the user with another place to put their finger when cutting using the knife 10. Also, as seen in FIG. 2 and FIG. 8, the enlarged surface 60 inhibits the spare blade holder 32 from moving toward the open position when the blade holder 14 is in the folded position.

In operation, to open the blade holder 14 to the intermediate position, the user presses the button 24 to move the second portion 29 out from within the first notch 44, which allows the user to pivot the blade holder 14 from the folded position to the intermediate position (FIG. 5). With the button 24 released, the spring 25 moves the button 24 in the biasing direction of arrow A until the second portion 29 engages the second notch 46 to retain the blade holder 14 in the intermediate position. The frusto-conical shape 31 on the second portion 29 allows the second portion 29 to wedge into the notch 46 (FIG. 7).

To further open the blade holder 14 to the fully extended position, the user presses the button 24 to move the second portion 29 out from within the second notch 46, which allows the user to pivot the blade holder 14 from the intermediate position to the fully extended position (FIGS. 3 and 5). With the button 24 released, the spring 25 moves the button 24 in the biasing direction of arrow A until the second portion 29 engages the third notch 48 to retain the blade holder 14 in the fully extended position. To bypass the intermediate position and pivot the blade holder 14 from the closed position to the fully extended position, the user need only maintain pressure on the button 24 until the blade holder 14 pivots beyond the intermediate position.

FIGS. 10-14 illustrate a knife 110, which is a utility knife in the illustrated embodiment according to another embodiment. The utility knife 110 includes features similar to the utility knife 10 of FIGS. 1-9, and like components have been given like reference numbers plus 100. The utility knife 110 further includes an arcuate recess 167 along a bottom edge 152 of blade holder 114. The arcuate recess 167 provides a convenient and comfortable grip when the user grips the knife 110 on a portion of the blade holder 114.

Figure 15:
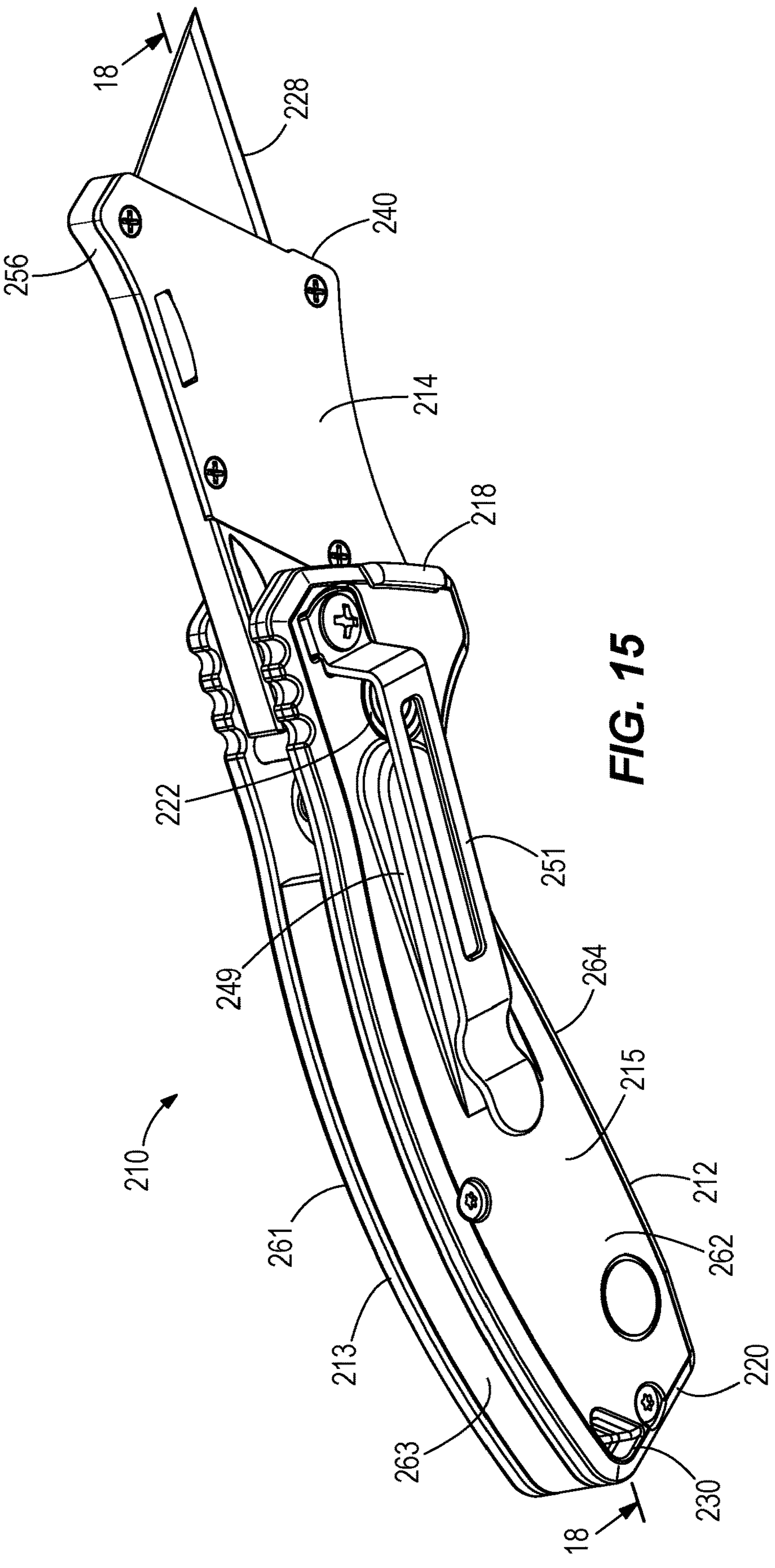
FIG. 15 is a perspective view of a utility knife according to another embodiment of the invention.

FIGS. 15-18 illustrate a knife 210, which is a utility knife in the illustrated embodiment, according to another embodiment. The utility knife 210 includes features similar to the utility knife 10 of FIGS. 1-9, and like components have been given like reference numbers plus 200. The utility knife 210 includes a handle 212 and a blade holder 214 that is pivotally coupled to the handle 212 and movable between a folded or retracted position (not shown) and an extended position (FIG. 15). The handle 212 includes first handle portion 213 and a second handle portion 215 opposite the first handle portion 213. A fastener 222 extends through the handle portions 213, 215 and the blade holder 214 to pivotally couple the blade holder 214 to the handle 212.

Figure 16:
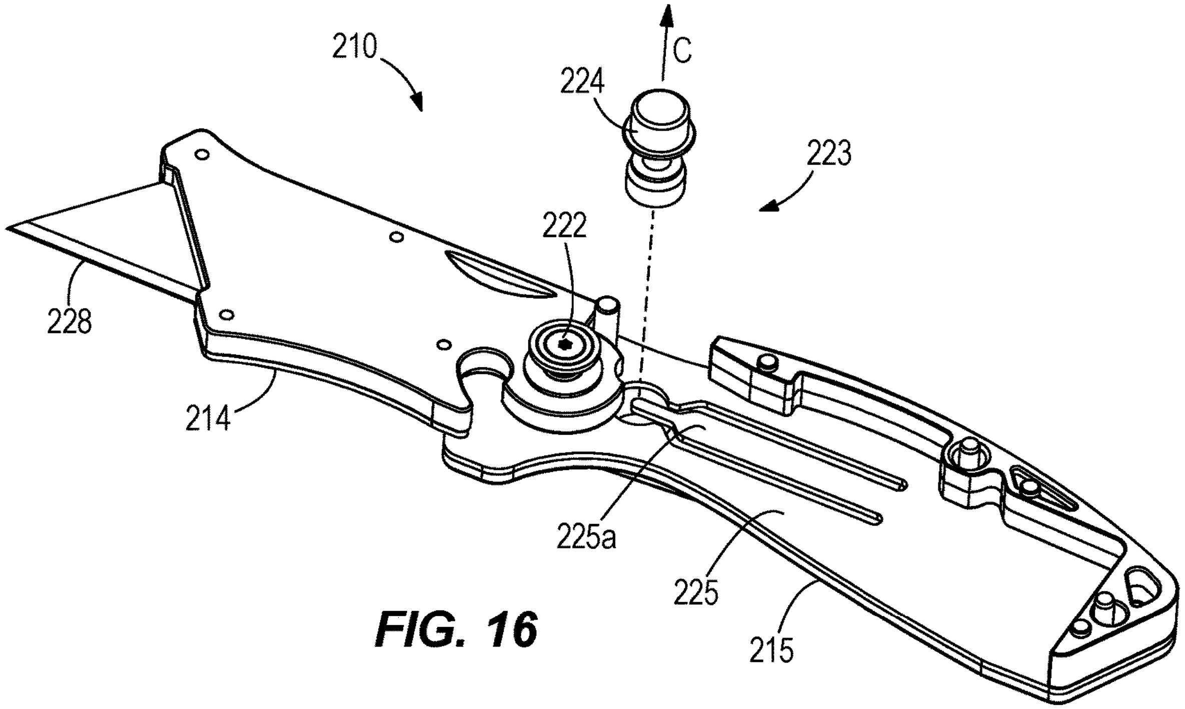
FIG. 16 is a partially-exploded view of a portion of the utility knife of FIG. 15.
Figure 18:
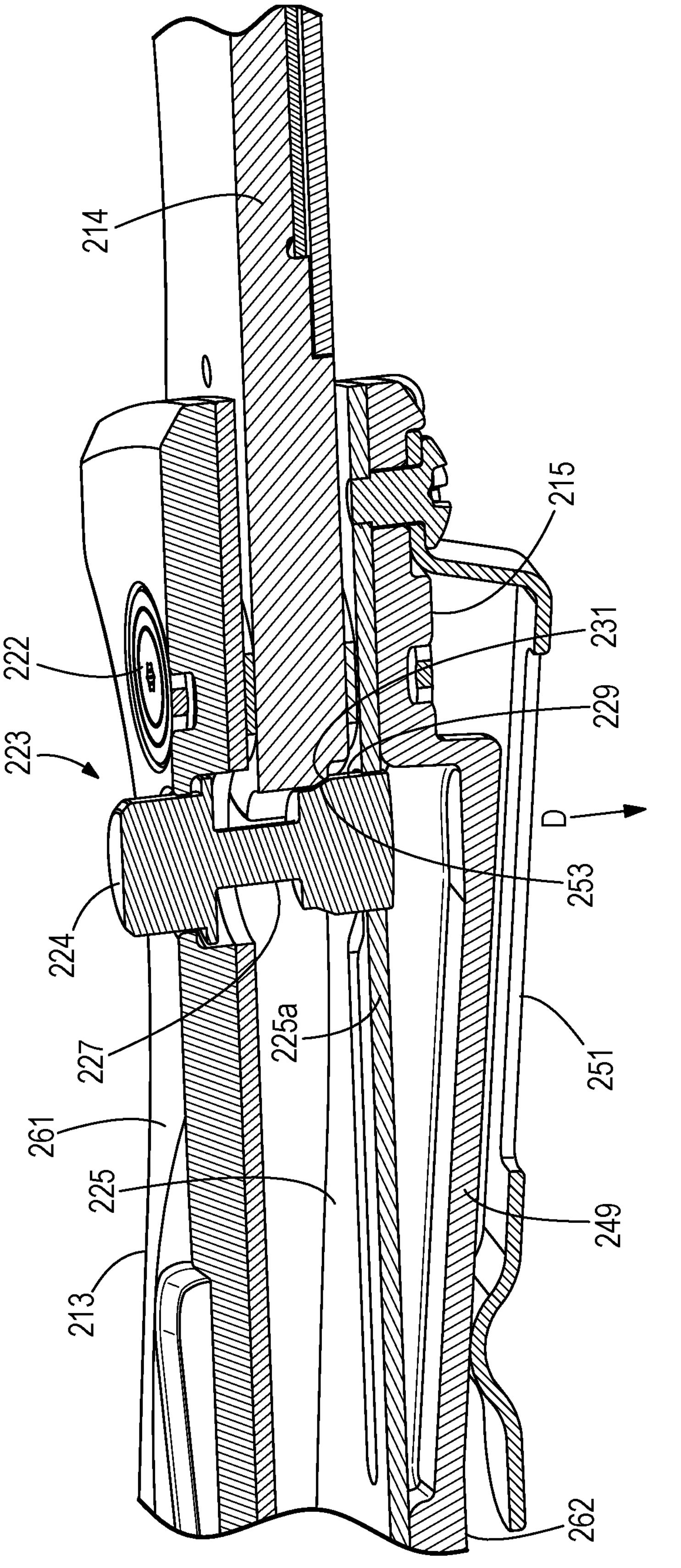
FIG. 18 is an enlarged cross-sectional view of the utility knife of FIG. 15, taken along line 18-18 in FIG. 15.

With reference to FIG. 16, the knife 210 further includes a locking mechanism 223 operable to lock and unlock the blade holder 214 to allow the user to pivot the blade holder 214 relative to the handle 212. The locking mechanism 223 includes a push button 224 and a spring 225. Referring to FIG. 18, the push button 224 has a first portion 227 of a first diameter and a second portion 229 of a second diameter that is larger than the first diameter. The illustrated second portion 229 includes a generally frusto-conical external surface 231. The spring 225 in the illustrated embodiment is a spring plate having a resilient finger **225*a* that is engageable with the push button 224. The finger 225*a* may be formed by removing (e.g., by punching or cutting) a portion of the spring plate 225. The finger 225*a* is bent out of plane with the remainder of the spring plate 225, and a free end of the finger 225*a* engages the push button 224 to bias the push button 224 in the direction of arrow C in FIG. 16**.

With reference to FIGS. 15 and 18, the second handle portion 215 includes an accommodating portion 249 that projects outwardly beyond the remainder of the second handle portion 215. In the illustrated embodiment, the accommodating portion 249 is tapered from a maximum thickness proximate the fastener 222 to a minimum thickness in a direction toward a back end portion 220 of the handle 212. The accommodating portion 249 is generally hollow and is aligned with the finger **225*a*. As such, the accommodating portion 249 accommodates deflection of the finger 225*a* in the direction of arrow D in FIG. 18, allowing the thickness of the remainder of the handle 212** to be minimized.

With reference to FIG. 15, the illustrated utility knife 210 further includes a belt clip 251 coupled to the second handle portion 215. The belt clip 251 is coupled to the second handle portion 215 by a single fastener proximate a front end portion 218 of the handle 212. In other embodiments, the belt clip 251 may be coupled to the handle 212 in other ways or orientations. In some embodiments, the belt clip 251 may be reversible, such that it may be coupled to either the first handle portion 213 or the second handle portion 215. In the illustrated embodiment, the belt clip 251 substantially overlies the accommodating portion 249 such that the accommodating portion 249 is disposed between the belt clip 251 and the remainder of the second handle portion 215.

Figure 17:
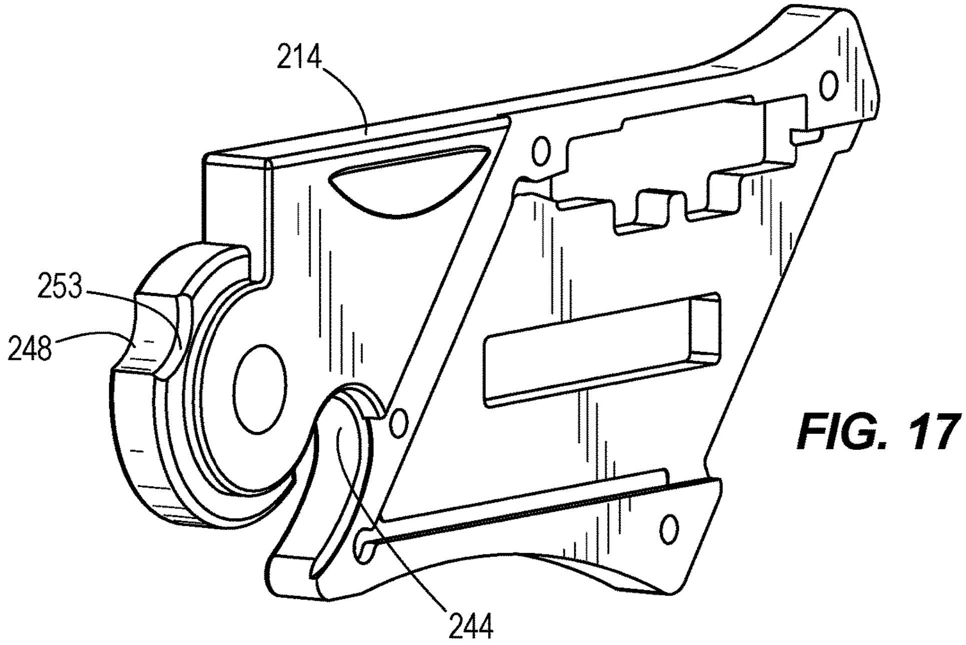
FIG. 17 is a perspective view of a blade holder of the utility knife of FIG. 15.

Referring to FIG. 16, the blade holder 214 includes a front end portion and a back end portion, opposite the front end portion. The back end portion of the blade holder 214 includes a first notch 244 and a second notch 248. When the second portion 229 of the push button 224 is received in the first notch 244, the blade holder 214 is held in the retracted position. When the second portion 229 of the push button 224 is received in the second notch 248, the blade holder 214 is held in the extended position. The blade holder 214 further includes a beveled surface 253 adjacent the second notch 248 (FIG. 17). The beveled surface 253 generally follows the contour of the external surface 231 of the second portion 229. This provides a relatively large contact area between the blade holder 214 and the push button 224, thereby producing a stronger, more secure locking engagement.

In the illustrated embodiment, the blade holder 214 is made from powdered metal, using a suitable powdered metal manufacturing process. For example, the blade holder 214 may be produced by compaction and sintering, metal injection molding (MIM), or any other suitable process. By making the blade holder 214 from powdered metal, the various complex features of the blade holder 214, such as the notches 248, 244 and the beveled surface 253, can be integrally formed without requiring additional machining steps.

Although the invention has been described in detail with reference to certain preferred embodiments, variations and modifications exist with the scope and spirit of one or more independent aspects of the invention as described.

What is claimed is:

1. A utility knife comprising:

a handle comprising a first longitudinal side, a second longitudinal side opposite the first longitudinal side, a top side, a bottom side, and a slot that extends through the bottom side, the slot between the first and second longitudinal sides, wherein the handle comprises a first surface;

a blade;

a blade holder, the blade removably coupled to the blade holder, the blade holder pivotable with respect to the handle between an extended position where the blade is exposed and configured to cut a work-piece and a folded position where the blade is within the slot of the handle, the blade holder comprising a first notch and a second notch; and a spare blade holder comprising a recess that receives a spare blade, the spare blade holder pivotal with respect to the handle between an open position where the spare blade can be removed from the spare blade holder and a closed position where the recess is within the slot of the handle to inhibit removal of the spare blade from the spare blade holder, wherein the spare blade holder comprises a second surface, and wherein the second surface of the spare blade holder engages the first surface of the handle when the spare blade holder is in the closed position to bias the spare blade holder away from the first blade holder;

a locking mechanism comprising:

a push button movable between a locked position and an unlocked position, the blade holder pivotable with respect to the handle between the extended and folded positions when the push button is in the unlocked position and the blade holder is held from pivotal movement relative to the handle when the push button is in the locked position, the push button comprising a first portion of a first diameter and a second portion of a second diameter that is larger than the first diameter and a frusto-conical portion between the first and second portions, the second portion of the push button is received in the first notch of the blade holder to hold the blade holder in the extended position and the second portion of the push button is received in the second notch of the blade holder to hold the blade holder in the folded position, and a coil spring that biases the push button toward the locked position.

2. The utility knife of claim 1, wherein the handle comprises a post that extends within an internal space defined within the coil spring, and wherein the post stabilizes the coil spring.

3. The utility knife of claim 1, wherein the push button comprises a recess, wherein an end of the coil spring is received within the recess of the handle and an opposite end of the coil spring is received within the recess of the push button.

4. The utility knife of claim 1, wherein the blade holder further comprises a third notch between the first notch and the second notch, wherein the second portion of the push button is received in the third notch of the blade holder to hold the blade holder in an intermediate position between the folded and extended positions.

5. The utility knife of claim 1, wherein the recess of the spare blade holder receives a plurality of spare blades, the spare blade holder pivotal with respect to the handle between an open position where a first spare blade of the plurality of spare blades can be removed from the spare blade holder and a closed position where the recess is within the slot of the handle to inhibit removal of the first spare blade of the plurality of spare blades from the spare blade holder.

6. A utility knife comprising:

a handle comprising a first longitudinal side, a second longitudinal side opposite the first longitudinal side, a top side, a bottom side, a slot that extends through the bottom side, the slot between the first and second longitudinal sides, and a first surface;

a blade;

a first blade holder, the blade removably coupled to the first blade holder, the first blade holder pivotal with respect to the handle between an extended position where the blade is exposed and configured to cut a work-piece and a folded position where the blade is within the slot of the handle; and a spare blade holder comprising a recess that receives a spare blade, the spare blade holder pivotal with respect to the handle between an open position where the spare blade can be removed from the spare blade holder and a closed position where the recess is within the slot of the handle to inhibit removal of the spare blade from the spare blade holder, the spare blade holder further comprising a second surface, wherein the second surface of the spare blade holder engages the first surface of the handle when the spare blade holder is in the closed position to bias the spare blade holder away from the first blade holder.

7. The utility knife of claim 6, wherein the second surface of the spare blade holder engages the first surface of the handle to bias the spare blade holder from interfering with movement of the first blade holder.

8. The utility knife of claim 6, wherein engagement of the second surface and the first surface forces the spare blade holder against the handle.

9. The utility knife of claim 6, wherein the handle further comprises a front end portion and a back end portion opposite the front end portion, and wherein the first blade holder is pivotally coupled to the handle adjacent the front end portion and the spare blade holder is pivotally coupled to the handle adjacent the back end portion.

10. The utility knife of claim 9, wherein the first blade holder comprises an enlarged portion that inhibits the spare blade holder from moving to the open position when the first blade holder is in the folded position.

11. The utility knife of claim 6, comprising a magnet configured to retain the spare blade in the spare blade holder.

* * * * *